(12) United States Patent
Margeta

(10) Patent No.: US 11,820,451 B1
(45) Date of Patent: Nov. 21, 2023

(54) ENHANCED SECURITY BICYCLE AND SCOOTER PARKING RACK

(71) Applicant: Damir Margeta, Sarajevo (BA)

(72) Inventor: Damir Margeta, Sarajevo (BA)

( * ) Notice: Subject to any disclaimer, the term of this patent is extended or adjusted under 35 U.S.C. 154(b) by 212 days.

(21) Appl. No.: 17/348,282

(22) Filed: Jun. 15, 2021

Related U.S. Application Data

(60) Provisional application No. 63/039,509, filed on Jun. 16, 2020.

(51) Int. Cl.
*B62H 3/00* (2006.01)
*B62H 5/00* (2006.01)

(52) U.S. Cl.
CPC .............. *B62H 3/00* (2013.01); *B62H 5/003* (2013.01)

(58) Field of Classification Search
CPC .... B62H 5/003; B62H 2003/005; B62H 3/00; B62H 5/00; B62H 3/04; B62H 5/005; Y10T 70/5872; Y10T 70/5881; E05B 71/00
See application file for complete search history.

(56) References Cited

U.S. PATENT DOCUMENTS

| | | | | | |
|---|---|---|---|---|---|
| 4,870,843 | A | * | 10/1989 | Lundberg | B62H 5/003 74/551.8 |
| 5,408,212 | A | * | 4/1995 | Meyers | E05B 45/005 340/432 |
| 6,223,907 | B1 | * | 5/2001 | Graber | B62H 3/00 211/5 |
| 2016/0144912 | A1 | * | 5/2016 | Greenblatt | F16B 5/02 211/5 |
| 2017/0305485 | A1 | * | 10/2017 | Little | B62H 3/00 |
| 2019/0047646 | A1 | * | 2/2019 | Mohamed | H04W 12/06 |

* cited by examiner

*Primary Examiner* — Hiwot E Tefera

(57) ABSTRACT

Enhanced security bicycle and scooter rack is an upright beam structure affixed to a solid surface. The rack has a rigid beam base structure, fully or partially fabricated of a specific cross-sectional profile and ancillary chains permanently attached to it, operable to be wrapped or loop around a bicycle or a scooter. Depending on the variant of the invention, additional correlating members of a specific design may be arranged and affixed to the base structure, which is purposed to facilitate the locking of bicycles and scooters to the invention with the use of a variety of conventional user-provided bicycle locks and padlocks.

18 Claims, 14 Drawing Sheets

US 11,820,451 B1

ENHANCED SECURITY BICYCLE AND SCOOTER PARKING RACK

CROSS-REFERENCE TO RELATED APPLICATION

The present application claims benefits in part to the U.S. provisional patent application Ser. No. 63/039,509 filled on 16 Jun. 2020. The entire disclosure is included herein in its entirety at least by reference.

TECHNICAL FIELD

The present disclosure relates to bicycle and scooter parking rack, street furniture design.

BACKGROUND OF THE INVENTION

Safe bicycle parking racks are a necessary element of bicycle infrastructure and prerequisite to the convenient development of bicycle traffic in big cities where bicycle commute is a viable and convenient alternative to congested pavements of motorized traffic. Safety against theft and vandalism is the main feature of the properly designed bicycle parking racks, especially with an advent of high technology and higher cost bicycles. This problem is getting even bigger prominence with present fast-paced development of electric bicycles and agile electric scooters.

Cyclist and scooterists usually secure their bicycles or scooters in the vicinity of their destination to the provided bike racks, or available nearby posts with portable bicycle locks, preferably conventional U-locks. Bicycle racks known in the art, or available street furniture, due to their structure and design, usually enable cyclists to secure frame and only one wheel of the bicycle at most. Therefore, cyclists have to provide additional chains and looped cables that are heavy to carry around, which is the reason many forget or refuse to use them, thereby leaving their parked bicycles more exposed to a higher risk of theft and vandalism. The type of theft when one or more essential parts of a parked bicycle, one of the wheels or frame, get stolen away from a public bike rack in a public space, for instance in city streets, led to the advent of abandoned bicycles, which are not only the problem to their owners but also to the cities managing the public bicycle parking lots. This can be prevented by providing convenient bike racks of enhanced security features and design in needed locations, which will comprise additional integrated securing elements, adjusted to be used in association with a variety of conventional user-provided bicycle locks and padlocks, such that to enable securing at least both wheels and the frame of a parked bicycle.

Overview—Brief Summary of the Invention

Disclosed is a bicycle and scooter parking rack with enhanced features against theft and vandalism. In all its variants, the invention includes a rigid upright base structure, comprised of two uprights and a crossbar, flexible binding members such as ancillary chains, preferably cut-resistant and case-hardened, that are attached to each of the base structure uprights, and additional correlating securing members, such as a lock bracket, or alternatively, a horizontal lean bar, of specific configuration and design, which are affixed to the base structure, and may further include padlock pegs.

The base structure is affixed to hard surface or ground and able to support bicycles and scooters, preferably in an upright and parallel positions, at least one on each side of the invention. The base structure horizontal cross-sectional profile, along the entire length of the base structure, or at least along the uprights, is about in the shape of letters "U", "T" or "C", depending on the variant of the invention, which is novel to the trade and enable advantageous properties of the invention. In all present variants of the invention, the base structure is formed in the contours of a hoop or an inverted-U bicycle rack, which are known in the trade. The U-profile cross-sectional embodiments of the invention are preferably made from a single section of U-profile beam which is bent inwards, such that the open side of the first upright is oriented toward the open side of the second upright. In other words, open sides of the opposite uprights are facing each other. The ancillary chains, comprised of a plurality of connected links, are permanently attached by fastening means, e.g. bolts, screws, rivets or similar, inside semi-enclosed housings at the upper part of each upright. The semi-enclosed housings may be permanently attached, usually welded, to the uprights as a separate component, or machined inside the uprights and the base structure. The ancillary chains are attached inside the semi-enclosed housings by their top end, and vertically extending through their bottom side, suspended along and within the inner contours of the uprights. In their idle position, the chains are concealed and vertically suspended as pendulums within the uprights, yet being easily accessible and deployed from the uprights when needed.

The U-profile cross-sectional embodiments with the same afore explained features, may be made by machining, preferably by laser cutting vertical slits on the inner side of a square pipe, in which the uprights preserve the same afore-described function. Additionally, the C-shaped cross-sectional profile is yet another variation of the invention, such that the C-profile cross-section of the uprights is machined by cutting out slits on round pipes instead. The slits from the opposite uprights are oriented inwards, one toward another, wherein sized and as wide enough to provide unobstructed access for pulling the ancillary chains out, and their retraction inside the upright, preferably through the swinging motion of the ancillary chain as a pendulum in the initial position, as same as with the U-profile beam embodiments.

The T-profile cross-sectional embodiments features the base structure, or at least the uprights, made from a T-profile cross-sectional beam. The base structure is shaped by bending the T-profile beam inwards in the vertical contours of the hoop or the inverted-U bike rack, but in comparison to the U-profile and C-profile cross-sectional embodiments, features the important differences, such that two ancillary chains are permanently attached to the each upright, one on the each side of the T-profile beam web, and preferably four per the embodiment. Since bicycles are intended to be parked on both sides of the invention, two ancillary chains from the opposite uprights on the same side, are preferably used as a pair in securing a parked bicycle on that same side. With the T-profile embodiments, chains are unconcealed in the idle position, and are permanently attached by thereof top side within the semi-enclosed housings. The ancillary chains are suspended vertically along the upright sides as pendulums, thereby being easily accessible, but aesthetically and geometrically still disposed within vertical contours of the uprights, without an unsightly protrusion from thereof.

The ancillary chains configuration, without thereof unsightly protrusion outside the contours of the invention, is novel in the trade, and inherent to all the variants of the invention. It is advantageous and contributes to the aesthetics of the invention in comparison to solutions of prior art that also may feature ancillary safety chains. In some of the examples of prior art, a chain is repositioned to the idle position or within the bike rack contours by a spring or a chain-retracting mechanisms operated by a heavy weight when disengaged from the bicycle locks or a parked bicycle. The introduced pendulum suspension of the invention is simpler, easier to use, and easily fabricated, yet both material and cost-effective since it requires the shorter length of the chain, and demands no complex additional parts nor mechanisms. In all embodiments, a bottom end of the chains protract downwards through the open bottom side of the semi-enclosed housings, approaching the base plates or ground, but without being in contact with it when in idle position. The ancillary chains bottom-end links are preferably oval or ring-shaped, but not limited to, and sized for being loosely hooked onto a U-lock shackle, padlock shackle, or a padlock peg, depending on the available locking alternative. The ancillary chains are configured to be wrapped and looped around the parts of a bicycle, primary securing the frame and both wheels, while the bottom-end links are hooked onto a U-lock shackle. The U-lock is supposed to be looped around both tubings of the bicycle frame, and engaged to either crossbar, lock bracket, or horizontal lean bar depending on the invention variant. Thereby, the both wheels and the bicycle frame are secured to the base structure of the invention with the U-lock. It should be noted that with the U-profile and the C-profile cross-sectional variants, only one bicycle can be secured as afore-described, preferred manner, since thereof preferably comprise one pair of the ancillary chains. However, the T-profile variant provide two pairs of the ancillary chains, one pair on the each upright, and enable securing two bicycles as afore-described. It should be understood that any variant of the enhanced security bicycle and scooter parking rack may be installed separately or in a group, in order to provide needed parking capacity to the desired number of bicycles at the subject location.

Additionally or optionally, embodiments of the invention preferably include additional correlating securing members, such as a lock bracket, or a horizontal lean bar in the alternative. Both members are permanently attached to the base structure and of specific configuration and design. The advantageous purpose of the named members is to enable and further facilitate parking bicycles of a different sizes and frame types. Essentially, the lock bracket or the horizontal lean bar enhance the anti-theft and anti-vandalism features of the invention by providing an optional and lower vertical position for engaging the bicycle locks to the essential parts of the parked bicycle, and facilitate the application of the ancillary chains in securing bicycles to the invention. Both additional correlating securing members may further comprise a padlock peg. For example, when engaged with either one of the additional correlating securing members, a U-lock shackle may easily be looped around a down tube, an essential part of every bicycle frame. Meanwhile, due to the lower optional position of the U-lock, the ancillary chains that are wrapped around the bicycle parts, are now in close reach in regards to the U-lock shackle, hence easily hooked thereto. Thereby, bicycles are easy to lock and secure, especially in case of a smaller and children's bicycles, or bicycles with a step-through frame.

Unlike the lock bracket, the horizontal lean bar enables another advantageous property of the invention—securing kick or electric scooters in an easy and convenient manner, preferably with a use of a conventional user-provided U-lock. Parking scooters is enabled with apertures, preferably of circular shape, which are disposed horizontally along the horizontal lean bar, and enabled to receive a U-lock shackle. The apertures provide a favorable horizontal adjustment of the U-lock and function as a point of anchorage for the U-lock shackle on the invention. When mounted and adjusted in a favorable position, the U-lock is readily engaged around one of the base structure uprights and parts of the scooter, such that scooter is tightly locked and well-secured against theft and vandalism. This type of solution introduces the multi-purpose character of the invention and is far simpler, yet effective than previous art, that introduced a similar concept in securing the scooters, but with the additional parts instead. Moreover, it should be understood that the horizontal lean bar in afore-described configuration may be easily applied to a conventional bike racks of previous art in order to capacitate them for parking kick or electric scooters as aforedescribed.

Additionally, invention embodiments comprising the lock bracket or the horizontal lean bar, preferably include a padlock peg on one, or both of their sides. The padlock peg is a member of preferably cylindrical shape, which advantageous function is to enable securing bicycles with a use of a user-provided conventional padlock. It is permanently attached at the bottom end of the lock bracket or in the middle of the horizontal lean bar, and configured for receiving a padlock shackle inside a padlock eyelet, wherein enabling the function of locking bicycles to the invention with the correlation of the ancillary chains, and a variety of user-provided padlocks as the locking element instead of bicycle locks in securing the both wheels and frame of the bicycle. The positioning of the padlock on the invention peg is advantageous in comparison to the previous art of a similar concept. Both with the lock holder and horizontal lean bar variants, the padlock peg is geometrically positioned above the center of gravity and geometry of the properly secured bicycles, thereby locking bicycles within the ancillary chains loop with three points of anchorage, two at the semi-enclosed housings, and the padlock peg being the third one, which prevents the parked and secured bicycle from sliding off, felling down to the ground, or being easily damaged in the attempt of vandalism. If the padlock peg was not configured as aforedescribed, or had not been provided at all, the padlock and ancillary chains would descend and be hanging closer to the ground, such that the locked bicycles would not have the needed stability from three points of anchorage when secured to the bike rack, and could easily be vandalized or stolen away since the padlock could be readily set in a position in which is more perceptible to a bolt cutter attack.

BRIEF DESCRIPTION OF THE DRAWINGS

The invention and thereof variations will be best understood by description and reference to the accompanying drawings illustrating one or more well-contemplated examples of thereof embodiments and, together with the description of the example embodiments, serve to explain the principles and implementations of the invention. In the Drawings.

DETAIL DESCRIPTION OF EXAMPLE EMBODIMENTS

Figure 1:
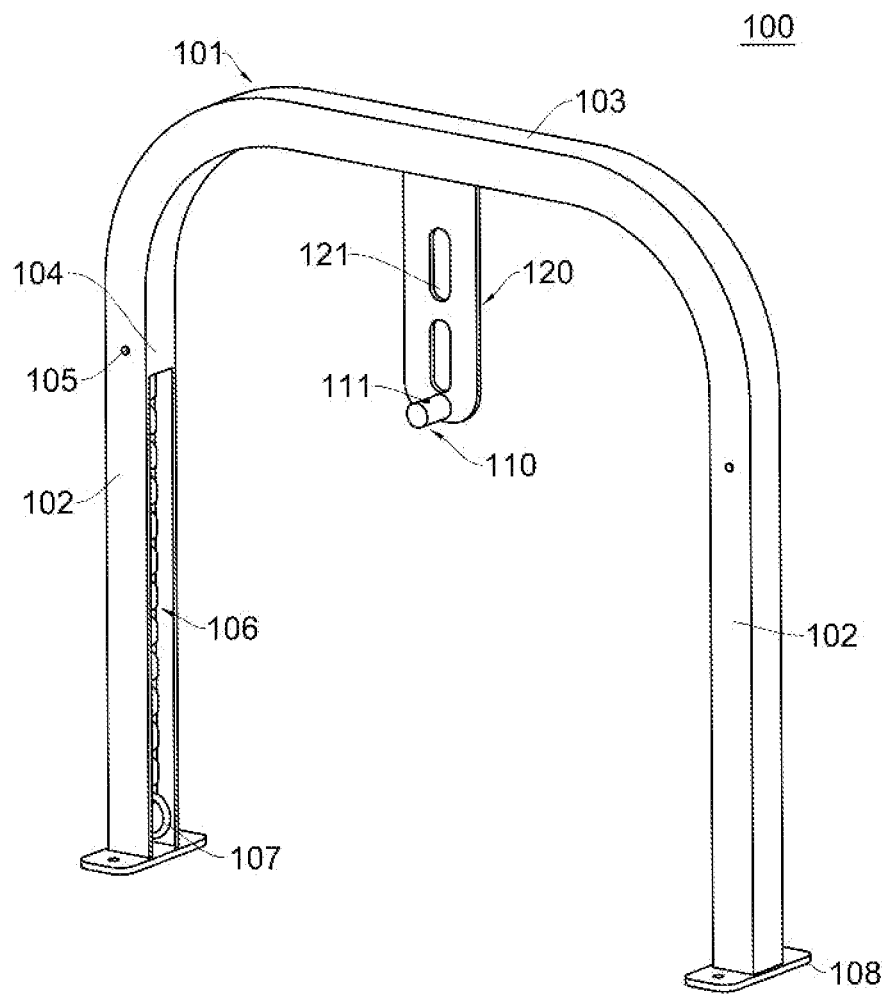
FIG. 1 is a perspective view of the U-profile variant of the present invention with the lock bracket
Figure 2:
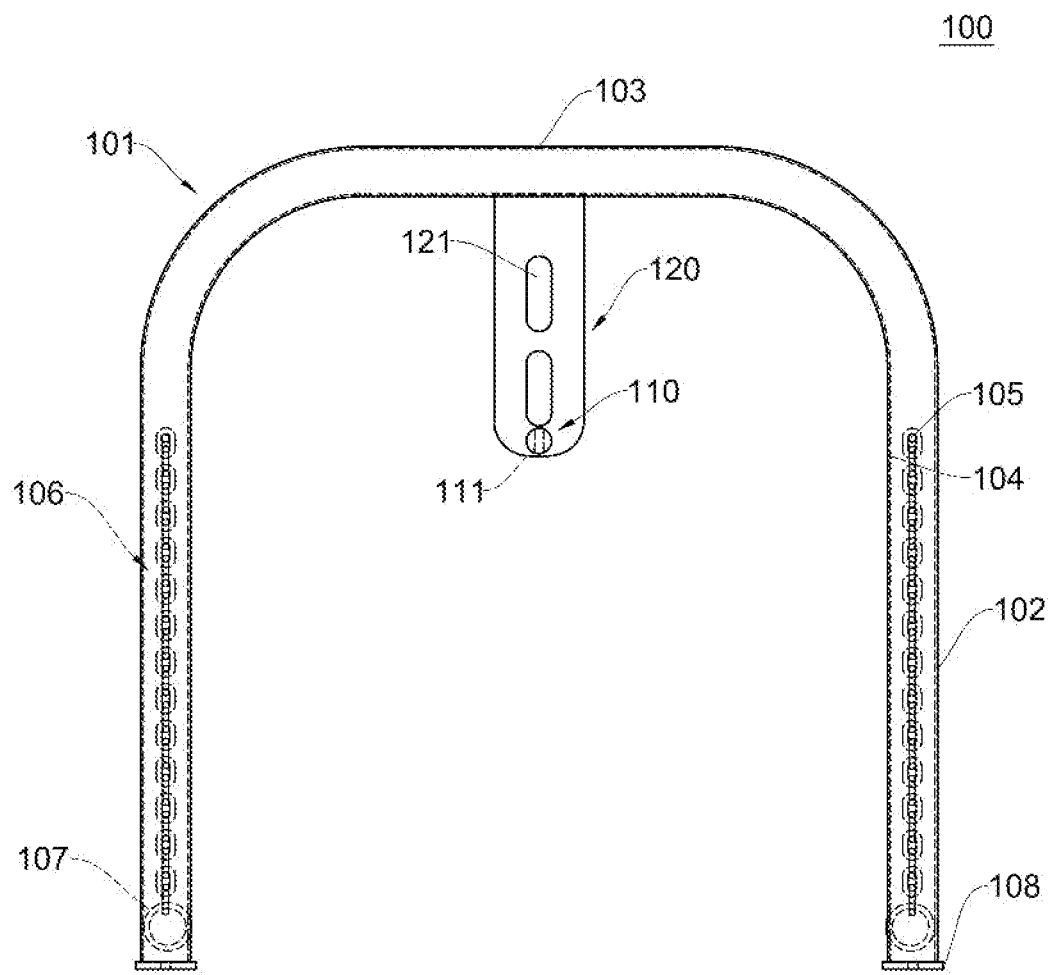
FIG. 2 is a front elevational view of the U-profile variant of the present invention with the lock bracket, showing in dashed lines the ancillary chains in their initial position inside the uprights
Figure 3:
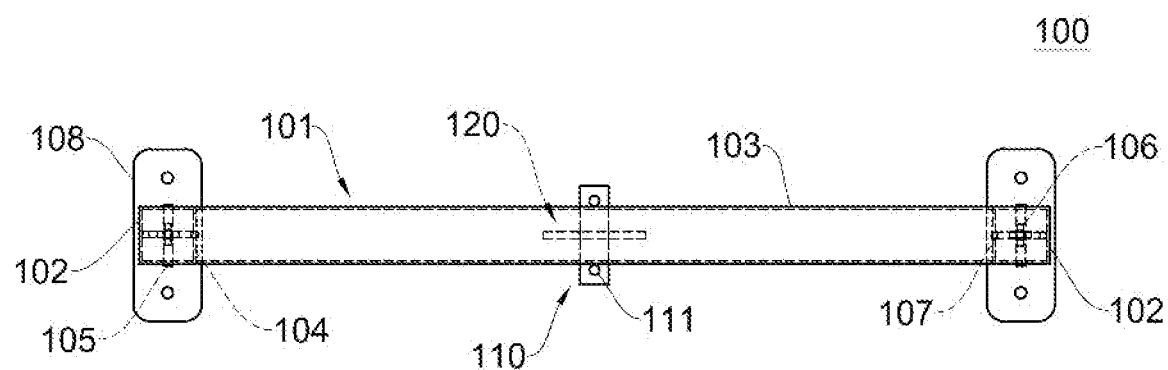
FIG. 3 is a top elevational view of the U-profile variant of the present invention with the lock bracket, showing in dashed lines the ancillary chains in their initial position inside the uprights
Figure 8:
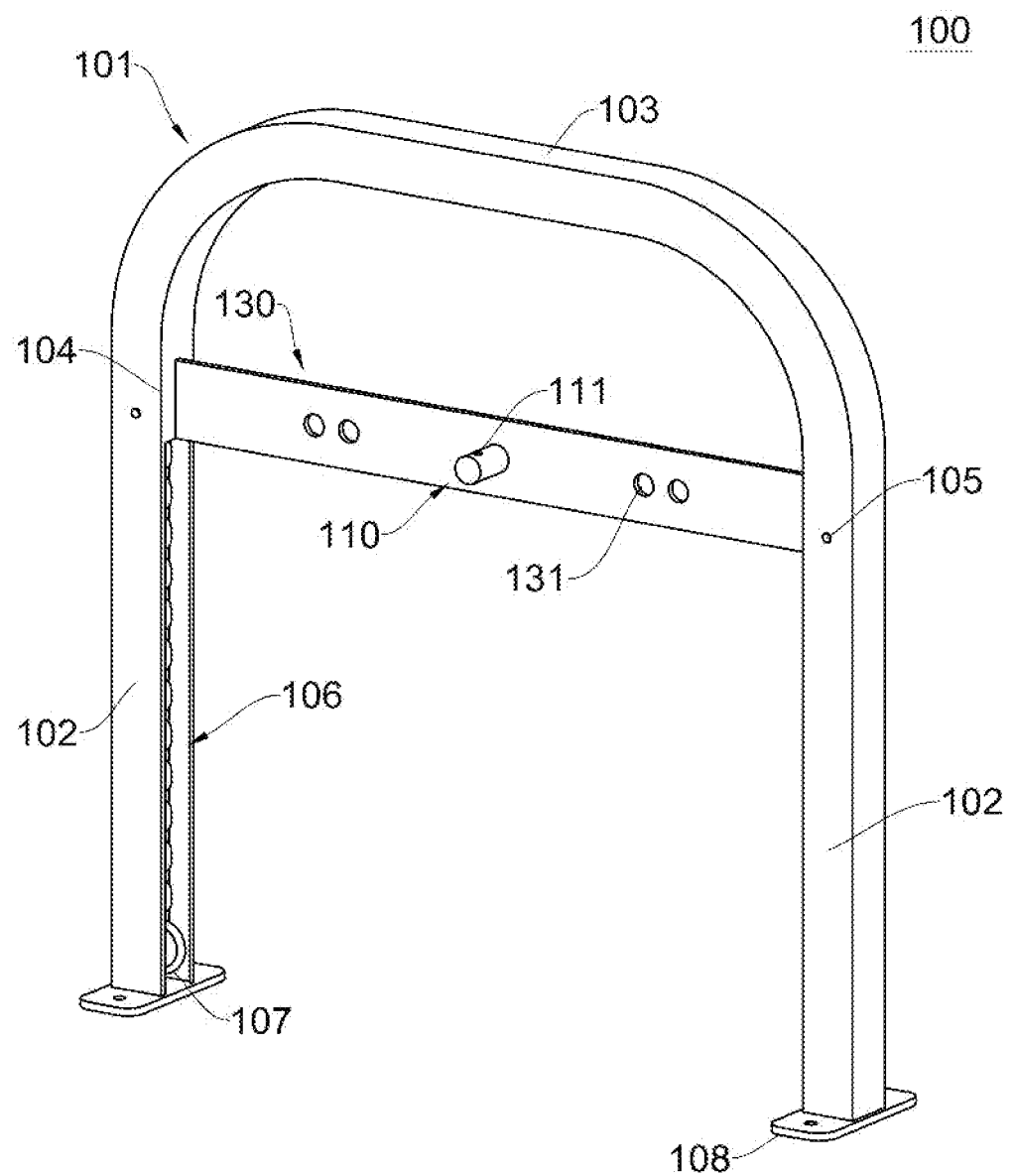
FIG. 8 is a perspective view of the U-profile variant of the present invention, with the horizontal lean bar

Referring more particularly to the figures, wherein like numbers refer to similar parts of similar functionality that, depending on the invention embodiment, may have a different appearance, the invention 100 comprises of a rigid upright base structure 101 formed as uprights 102 and a crossbar 103, an ancillary chains 106, an additional correlating securing members, such as a lock bracket 120 such shown in FIG. 1-3, or alternatively a horizontal lean bar 130 such illustrated in FIG. 8, that further may comprise padlock pegs 110, permanently attached thereto.

Figure 4:
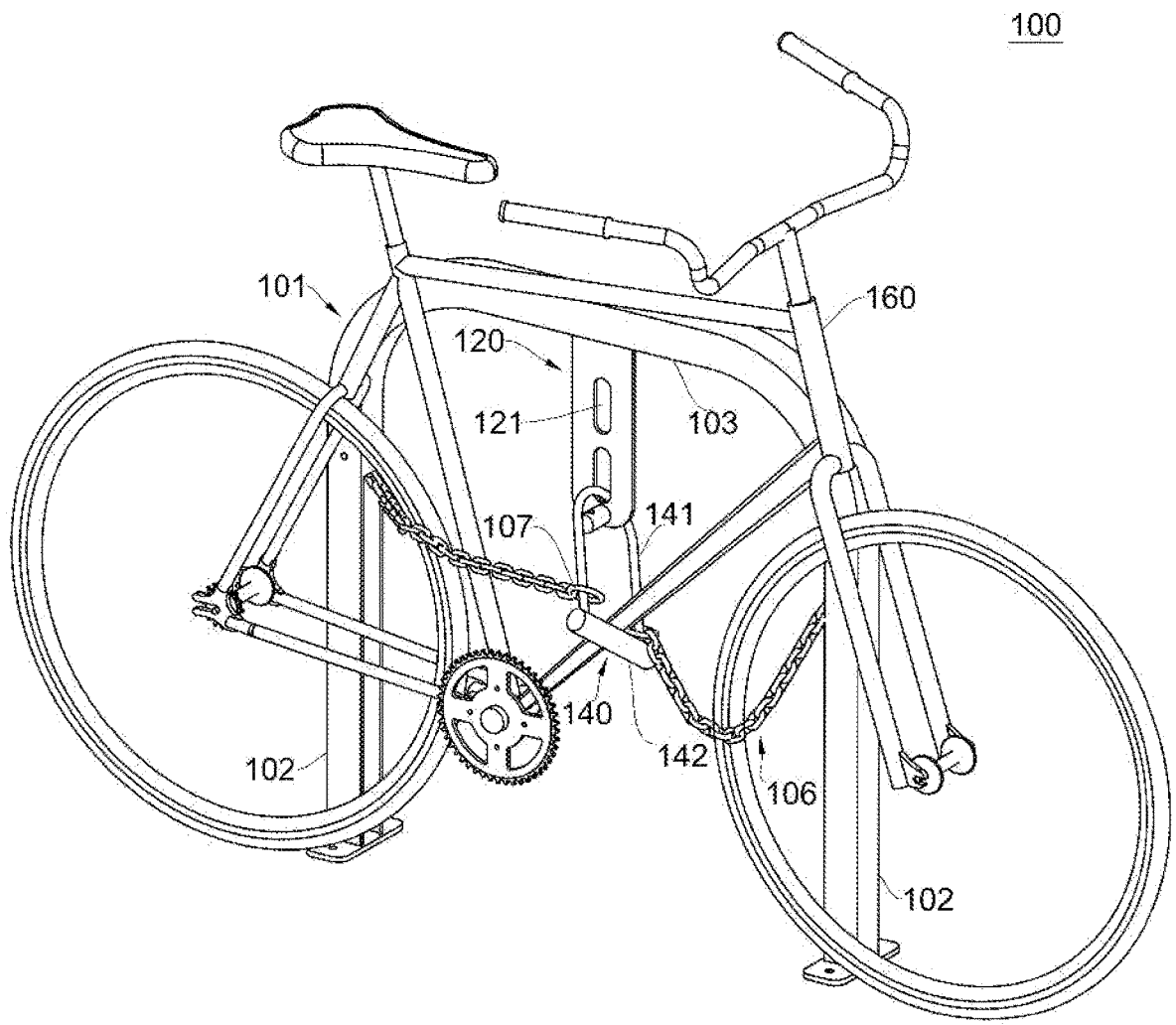
FIG. 4 is a perspective view of the U-profile variant of the present invention with the lock bracket, illustrating the contemplated use of the present invention for the parking of bicycles with the U-lock
Figure 5:
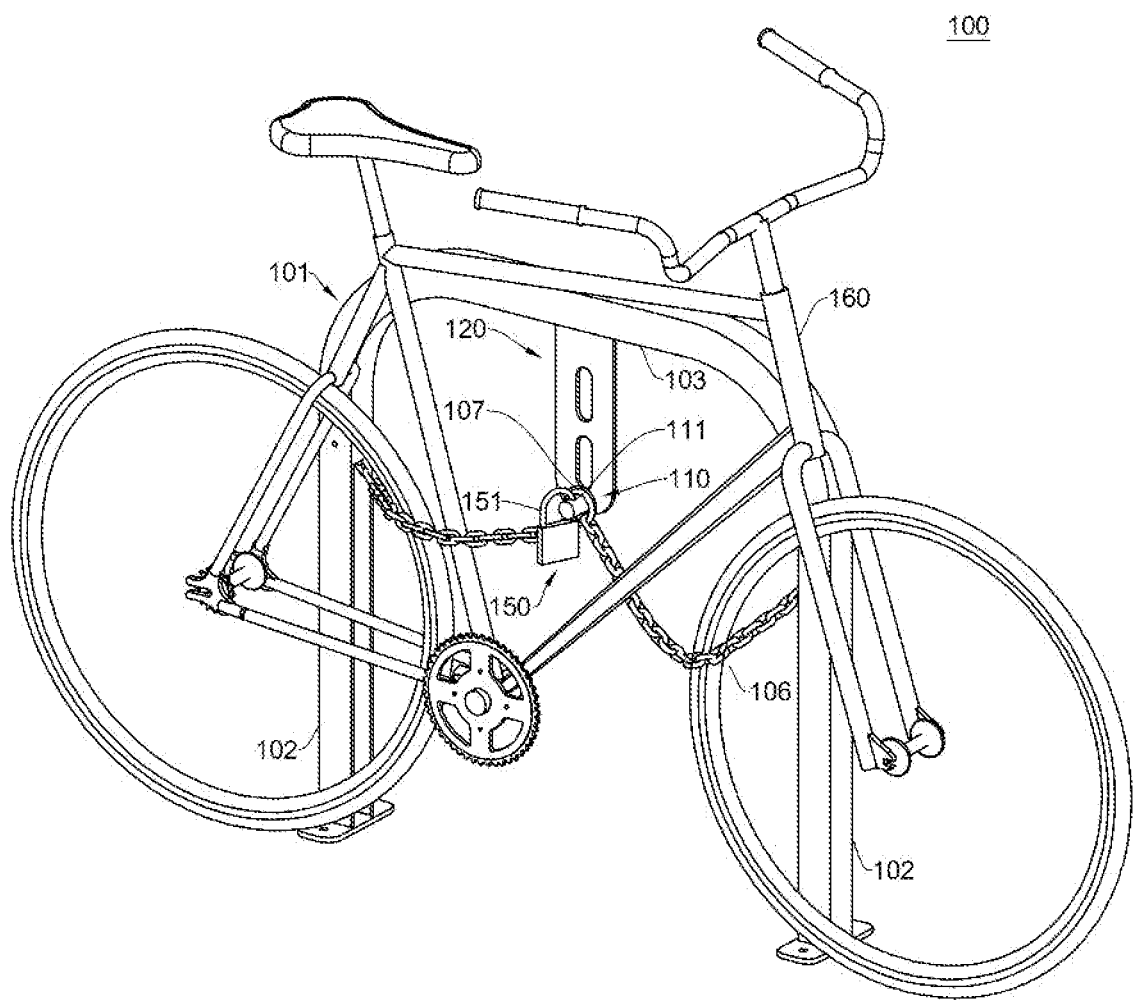
FIG. 5 is a perspective view of the U-profile variant of the present invention with the lock bracket, illustrating the contemplated use of the present invention for the parking of bicycles with the padlock
Figure 7:
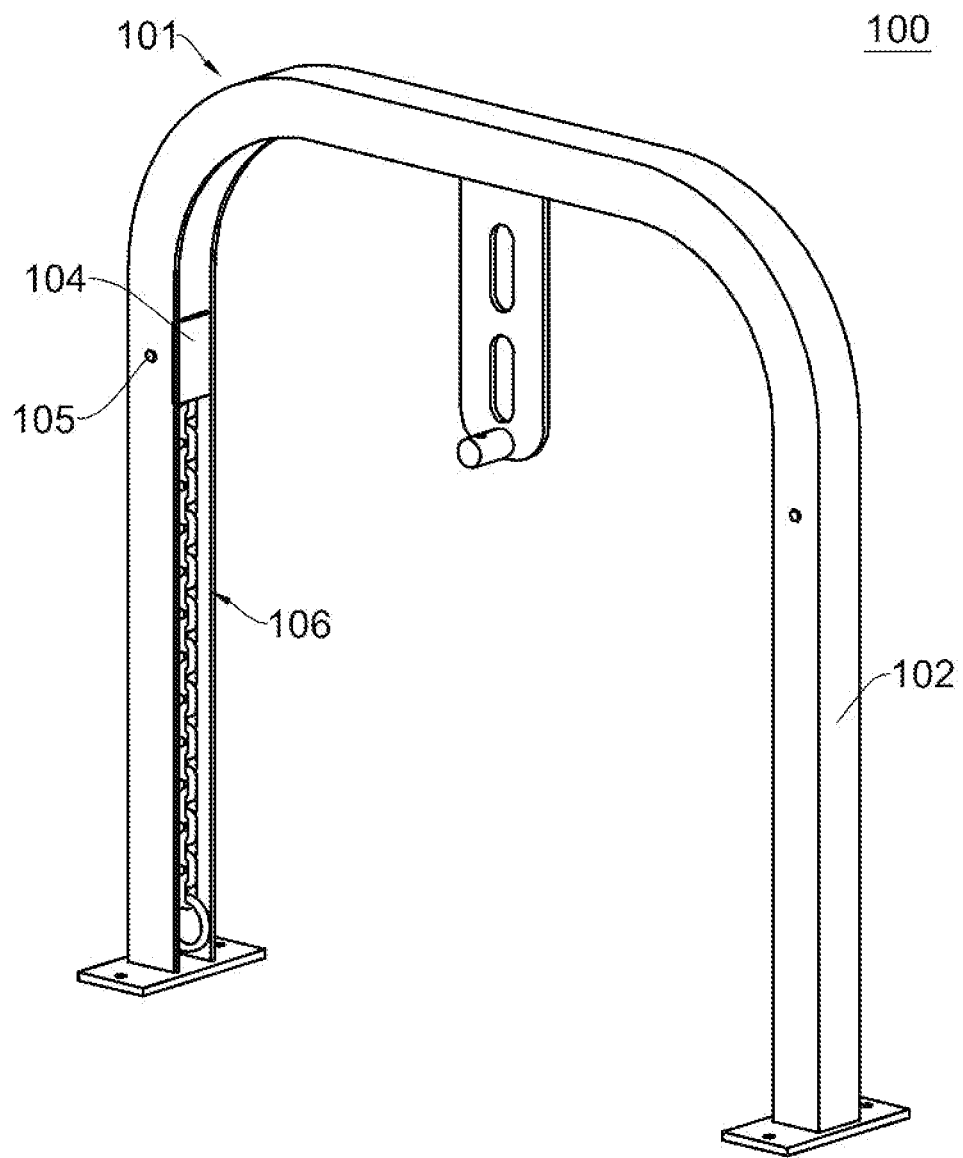
FIG. 7 is a perspective view of the U-profile variant, fabricated from the single section of the U-profile beam, of the present invention with the lock bracket
Figure 10:
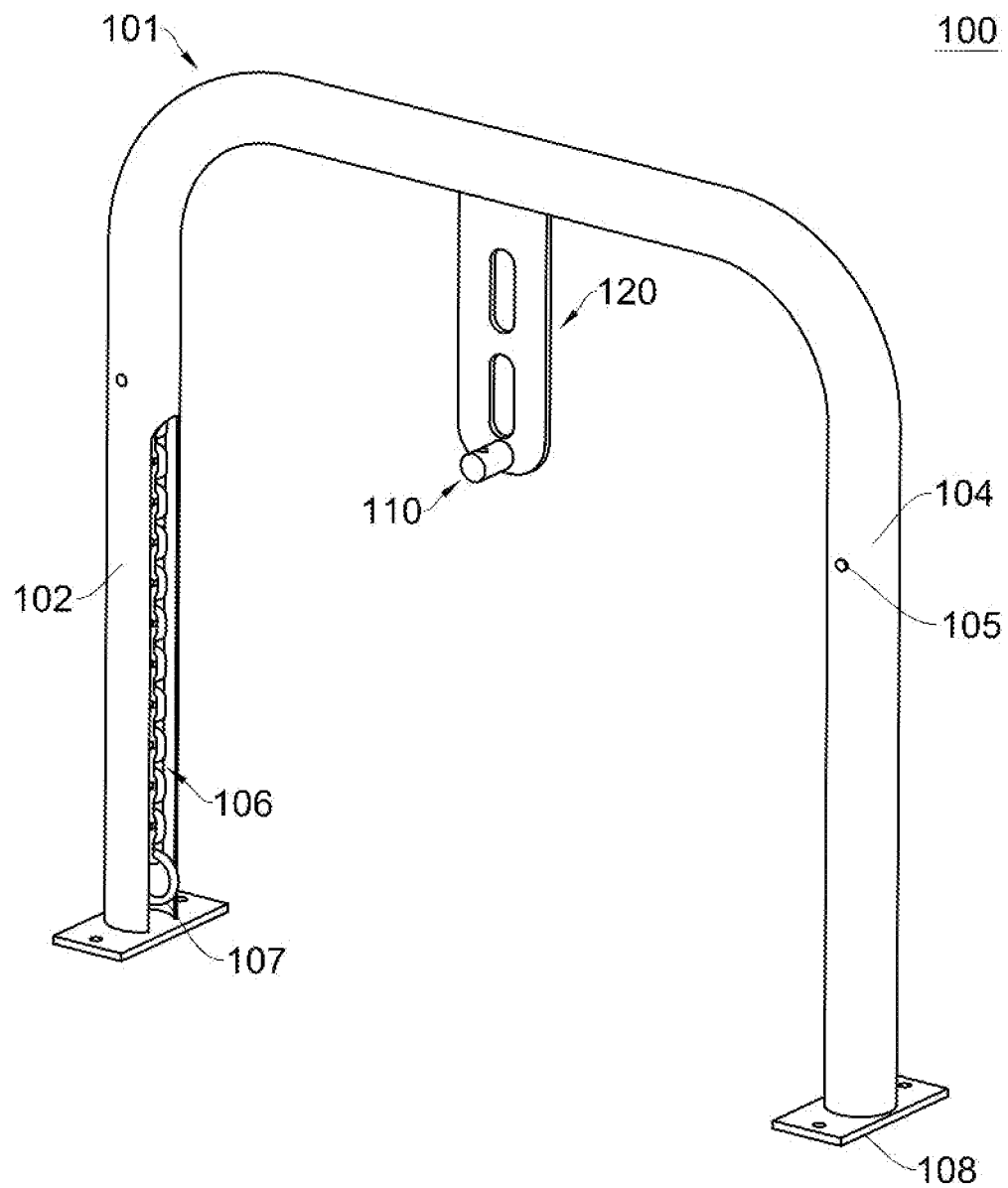
FIG. 10 is a perspective view of the C-profile variant of the present invention with the lock bracket
Figure 11:
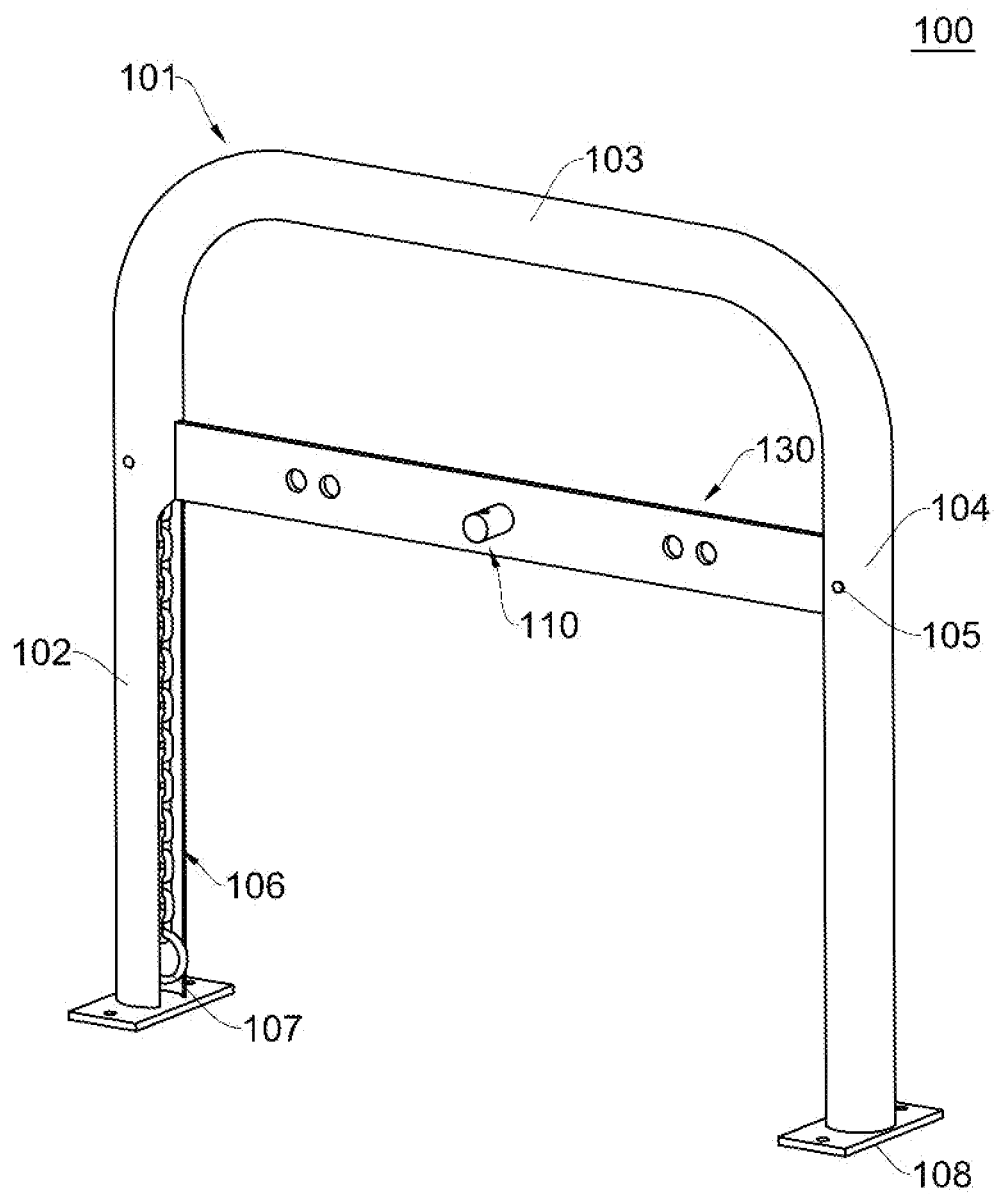
FIG. 11 is a perspective view of the C-profile variant of the present invention with the horizontal lean bar
Figure 12:
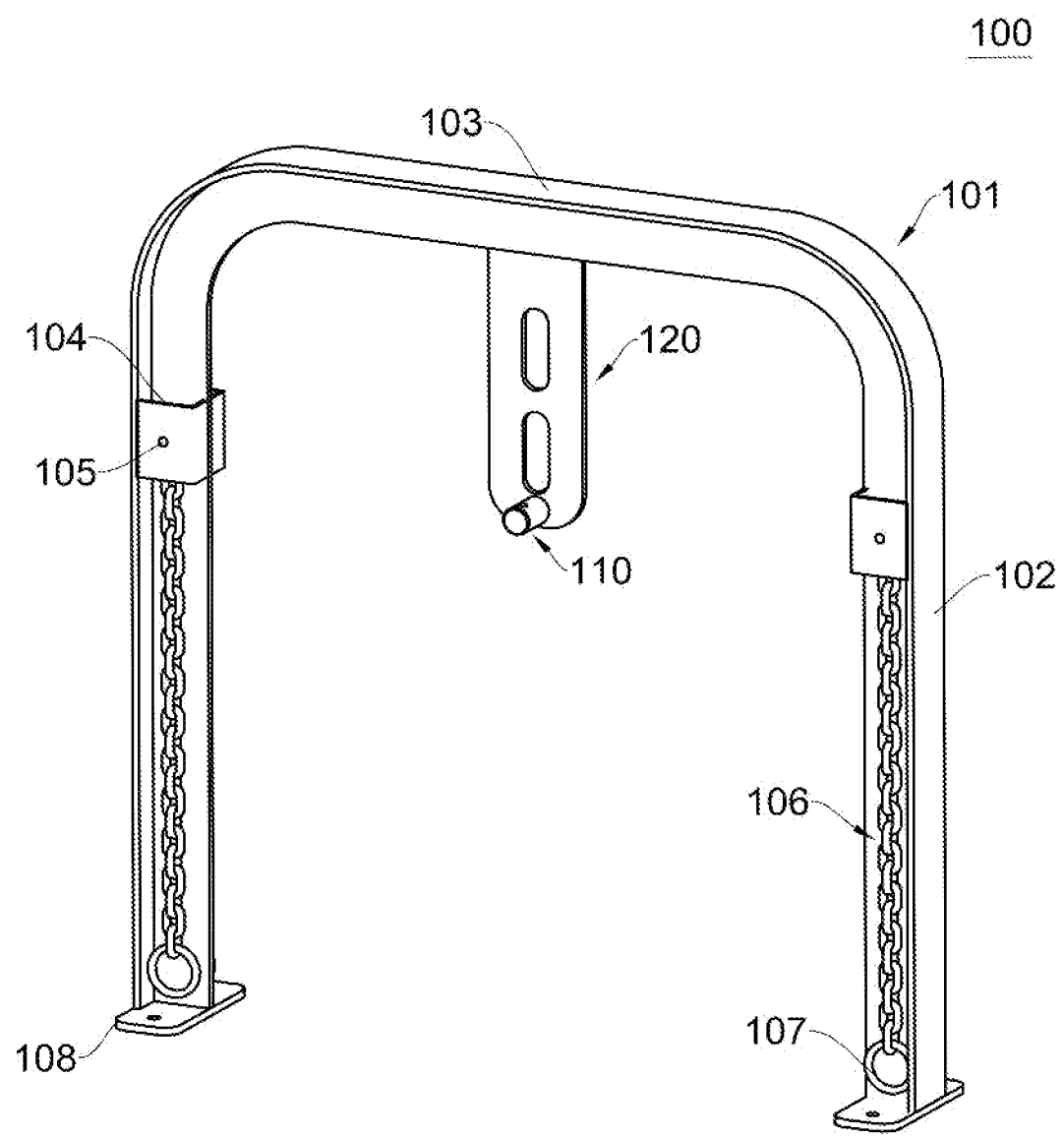
FIG. 12 is a perspective view of the T-profile variant of the present invention with the lock bracket
Figure 13:
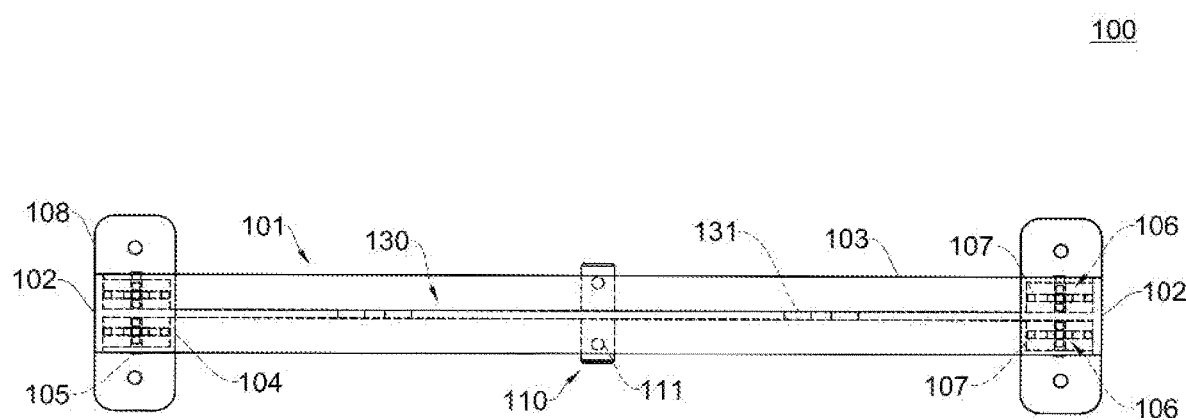
FIG. 13 is a top elevational view of the T-profile variant of the present invention with the horizontal lean bar, showing in dashed lines the ancillary chains in their initial position
Figure 14:
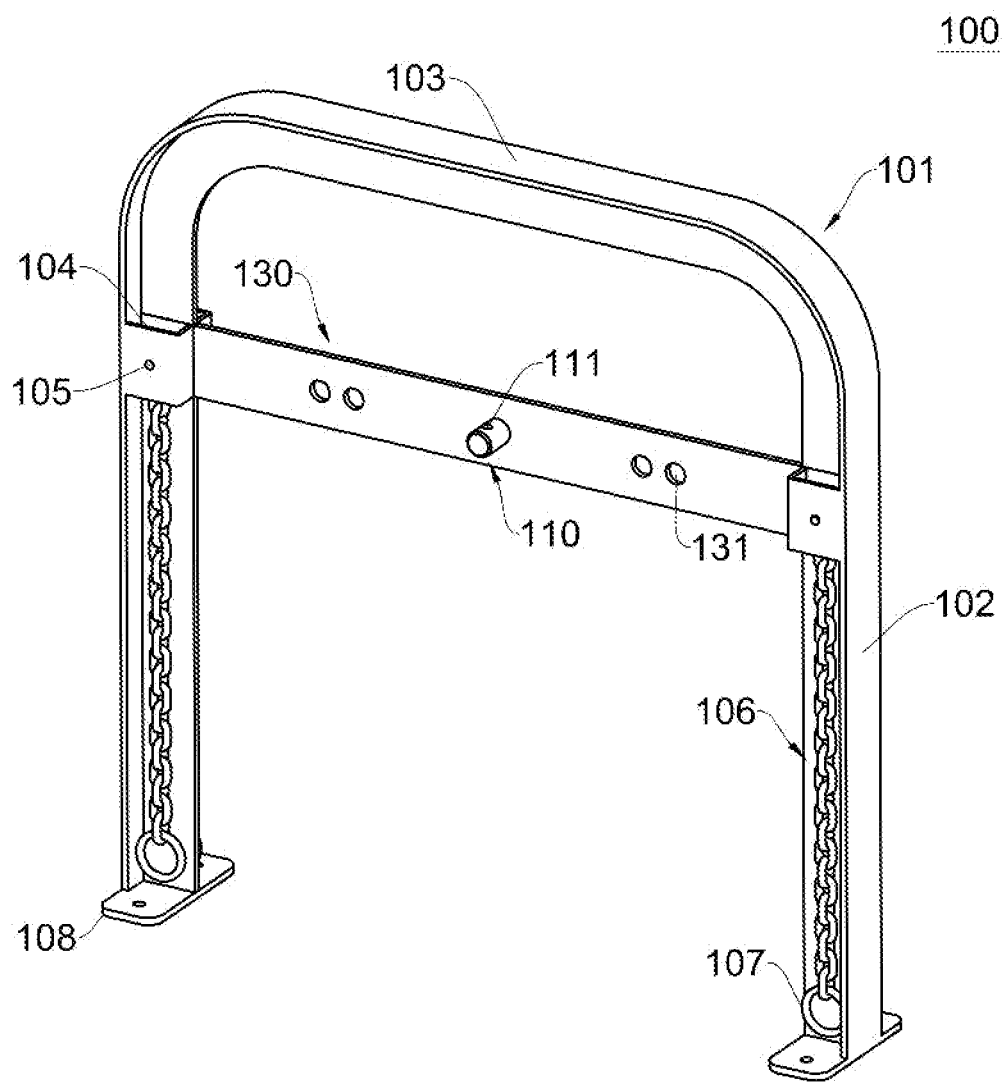
FIG. 14 is a perspective view of the T-profile variant of the present invention with the horizontal lean bar.

The base structure 101 is affixed to a solid surface or ground in a manner known in the trade, and capable of supporting and accommodating bicycles 160 as shown in FIG. 4, and optionally scooters 170, such as illustrated in FIG. 5, which are preferably parked parallel and leaned against the base structure 101 in an vertical position, on one, or both sides of the embodiment. The base structure 101 is fabricated of a beam, pipe or tube, depending on the embodiment, and bent in a vertical contours of a hoop or an inverted-U bicycle rack, which are state of the practice in the trade. The base structure 101, the crossbar 103, and the uprights 102, from the fabrication standpoint, depending on the variant of the invention and its embodiment, are preferably bent by a bending machine out of one section of U-profile beam as shown in FIG. 7, or a T-profile cross-sectional beams as shown in FIG. 12-14. Alternatively, the U-profile or the C-profile cross-sectional uprights 102 can be machined out of a square tubes or a round pipes, preferably by laser-cutting, as vertical slits sized to enable unobstructed employment, access, and retraction of the ancillary chains 106 within the uprights 102, wherein the uprights 102 feature the C-profile cross section when fabricated from the round pipe such as shown in FIG. 10-11, or the U profile cross-section when fabricated of square pipe, such as depicted in FIG. 1-3. Nonetheless, the crossbar 103 preferably remains as the full tube or pipe cross-sectional profile depending on the variant. The usage of the U-profile and the T-profile cross-sectional beams, or machining the uprights of the invention in the U-profile or the C-profile cross-section, is uncommon in the trade for this purpose, yet essential for the unique and advantageous properties and the aesthetics of the invention. Accordingly, depending on the variant of upright cross-sectional shape, the invention may be presented herein as the U-profile, C-profile and T-profile embodiments. Generally, all components of the invention 100 are made of metal, preferably steel of various quality and properties depending on a subject component, that further may be galvanized in order to provide rust-resistance of the embodiments. Also, it should be understood that the invention has been shown with the base plates 108 in all the present embodiments. However, the both uprights 102 may be extended in case of a in-ground installation.

As shown in embodiment depicted in FIG. 1-3, ancillary chains 106, are permanently attached by the known fastening means 105 within the semi-enclosed housings 104, that depending on the embodiment, may be permanently attached, preferably by welding, or machined inside the base structure 101, at the upper part of the uprights 102. The ancillary chains 106 are vertically suspended along, and within the uprights contours as pendulums, in their idle, initial, position. Both bottom-end links 107 of the ancillary chains 106 are approached to the base plates 108 or the ground, but not in contact with it. The ancillary chains 106 are configured to be wrapped around the bicycle 160 parts and used as a pair from the opposite uprights 102 in securing the both wheels and frame of the parked bicycle 160 with user-provided, conventional bicycle locks, preferably with a conventional U-lock 140, as shown in FIG. 4, or alternatively, with a conventional padlock 150, as depicted in FIG. 5.

As illustrated in FIG. 4, in order to utilize the maximum anti-theft and anti-vandalism features the invention, the bicycle 160 is leaned against the base structure 101 in an upright and parallel position. Both ancillary chains 106 are deployed from the uprights 102 and wrapped around wheels, frame, or other parts of a bicycle by the bottom-end links 107. A user-provided U-lock 140, is engaged to the vertical lock bracket 120 through the aperture 121, preferably of an elliptical shape. Furthermore, the both bottom-end links 107 are hooked onto the U-lock shackle 141 and locked within by the U-lock crossbar 142, thereby securing the both wheels and frame of the bicycle 160 within a loop between the base structure 101, ancillary chains 106, and the U-lock 140. It should be understood that the semi-enclosed housings 104 geometrically function as two anchorage points for the ancillary chains 106 in the opposite uprights of the embodiment, whereas the U-lock 140, engaged to the lock holder 120, functions as the third anchorage point of the loop. Similarly, in embodiments comprising the horizontal lean bar 130, such as shown in FIG. 8, the U-lock 140 would be engaged thereto, around the frame, and to the bottom-end links 107 in order to secure the parked bicycle 160. Alternatively, depending on the bicycle size, in both variants of the invention, the U-lock 140, may be engaged around the crossbar 103.

Alternatively, as illustrated in FIG. 5, a conventional padlock 150 may be used as the user-provided locking element, since the padlock peg 110 may be a comprising member of the lock bracket 120. After being wrapped around the wheels and frame of the bicycle 160, at least one of the bottom-end links 107 is hooked onto the padlock peg 110, thereby being in position between the lock bracket 120 and the padlock eyelet 111. The bottom-end link 107 of the second ancillary chain 106 can be further hooked onto the padlock peg 110 in the afore explained manner, or alternatively, onto the padlock shackle 151. The padlock shackle 151 is further inserted through the padlock eyelet 111. The inner diameter of the bottom-end rings 107 is sized to be compatible and hooked onto the padlock peg 110, but not as wide to allow bottom-end links 107 to be disengaged and pulled over the locked padlock 150 that is compatible with the padlock eyelet 111. Consequently, bottom-end links 107 are entrapped in-between the lock bracket 120, and the padlock 150, wherein the frame of the bicycle 160 and both wheels are secured with the padlock 150 within a loop with three points of anchorage, between the base structure 101, ancillary chains 106, and the padlock 150 which is engaged to the padlock peg 110.

The padlock peg 110 enables two additional advantages. Primarily, from the geometric standpoint, together with the semi-enclosed housings 104, enable securing the parked bicycle 160 to the invention within the loop with three points of anchorage, which correlates the ancillary chains 106 and the padlock 150. Second, the padlock peg 110 is positioned at about center of geometry and gravity for most bicycles of different types and sizes, thereby preventing thereof from sliding off and falling down easily to the ground. More importantly, the bicycle frame and both wheels could not be locked and secured firmly and tightly to the embodiment with the padlock 150 without the padlock peg 110. In such a case, the parked bicycle 160 would not have the needed support of the third anchorage point, provided by the padlock peg 110 within the loop, and hence would be more exposed to vandalism, by forcible shaking for example. Additionally, with its sizing, and preferably cylindrical shape, the padlock peg 110 defines the padlocks compatible with the invention, and configures padlock 150 in a higher vertical position in comparison to the ground, thereby preventing thieves to attack the padlock 150 easily with a bolt cutter, such that gaining the maximum leverage of the bolt cutter is obstructed or prevented.

In the U-profile embodiment, such as shown in FIG. 1-3, and the C-profile cross-sectional embodiments, such as illustrated in FIG. 10-11, the ancillary chains 106 are suspended and concealed within the uprights 102 from three sides, hence unnoticeable in their idle position. Such configuration improves the aesthetics of these embodiments, thereby its application and adaptivity for being installed in a variety of public and private spaces. In both named variants, the flanges of the cross-section of the uprights 102 are purposely oriented inwards, such that the open side of the first upright 102 is facing the open side of the second upright 102. In other words, in the U-profile and the C-profile embodiments of the invention, the open sides of the cross-section of the opposite uprights 102, are oriented inwards towards each other. Named configuration enables crucial advantages of the invention. First, at their top end, ancillary chains 102 are permanently attached and suspended vertically inside the sturdy semi-enclosed housings 104 with the known fastening means 105, such that each chain 106 is vertically aligned within the inner contours of the uprights 102, and is highly inconspicuous in the idle position, wherefore the U-profile and C-profile embodiments highly resemble conventional hoop, or inverted-U bicycle parking racks. However, when needed to secure a parked bicycle, chains 106 are easily deployed and accessible to be pulled out through the slits on the open side of the uprights 102. Second, and as equally important, aforedescribed geometry enables the deployment and the protraction of the ancillary chains 106 in their full available length, thereby facilitating and enabling more bicycles of different frames and sizes to be secured to the invention. Had the U-profile or the C-profile uprights 102 of the embodiments been oriented differently, a short but substantial length of the ancillary chains 106, at least some of its upper links, would be utilized for bypassing flanges of the uprights instead of being used for wrapping around the bicycle 160 parts in their full length, which is essential for securing bicycles to the invention, especially with the use of the padlock and the padlock pegs 110 such as depicted in FIG. 5. Finally, the inward orientation of the profile flanges facilitates the fabrication of the U-profile embodiments when made of a single elongated section of a U-profile beam, such as the embodiment illustrated in FIG. 7, since a bending machine that is used in the base structure forming process requires less bending power, hence making the manufacturing process more cost-effective. Due to the structure and intended dimensions, the U-profile, and C-profile embodiments are preferably suited to provide one ancillary chain 106 per each upright 102, i.e. two ancillary chains 106 per the embodiment.

The T-profile cross-sectional embodiments, such as depicted in FIG. 12-14, rely on the similar afore-described concept in securing bicycles to the invention. The main differences pertain to the additional function and different appearance in comparison to the U-profile and the C-profile embodiments. First, due to the T-profile cross-sectional geometry, two ancillary chains 106 may be attached and vertically suspended per each upright 102, preferably four per the embodiment. The ancillary chains 106, one at each side of the T-profile cross-sectional upright 102, are permanently attached by the known fastening means 105 within the semi-enclosed housings 104 to the upper part of the uprights 102. Sturdy affixed semi-enclosed housings 104 are purposed to fasten and tightly enclose the ancillary chains 106, thereby preventing thereof detaching or tampering with. In the T-profile embodiments, the ancillary chains 106 are noticeable and highly accessible, hence easily deployed in their full available length, but still aesthetically acceptable, and vertically aligned within the contours of the uprights 102 in their idle, initial, position, without an unsightly protrusion of the ancillary chains 106 structure outside the uprights 102. The ancillary chains 106 are most efficiently used for securing bicycles to the invention as a same-sided pair, deployed from the opposite uprights 102 of the embodiment. In order to prevent bicycles or scooters from being scratched or scuffed against the T-profile flanges, the base structure 101 may be coated in plastic, rubber, or other non-abrasive material.

As aforementioned, in all variants of the invention, the top end of the ancillary chains 106 is anchored within the semi-enclosed housing 104, and permanently attached to the upper part of the uprights 102 by the known fastening means 105. The suspended, unattached end of the ancillary chain 106, protracts vertically downwards through the bottom side of the semi-enclosed housing 104, and ends with a bottom-end link 107, wherein thereof inner diameter is as wide enough to be loosely hooked onto the U-lock shackle 141, padlock shackle 151 or padlock peg 110. Besides operating as the correlating member of the ancillary chains 106, the bottom-end links 107 also act as a bob of the pendulum and promote a swinging motion of the ancillary chains 106, hence its self-repositioning in the idle position when disengaged from bicycle locks or a parked bicycle.

Figure 6:
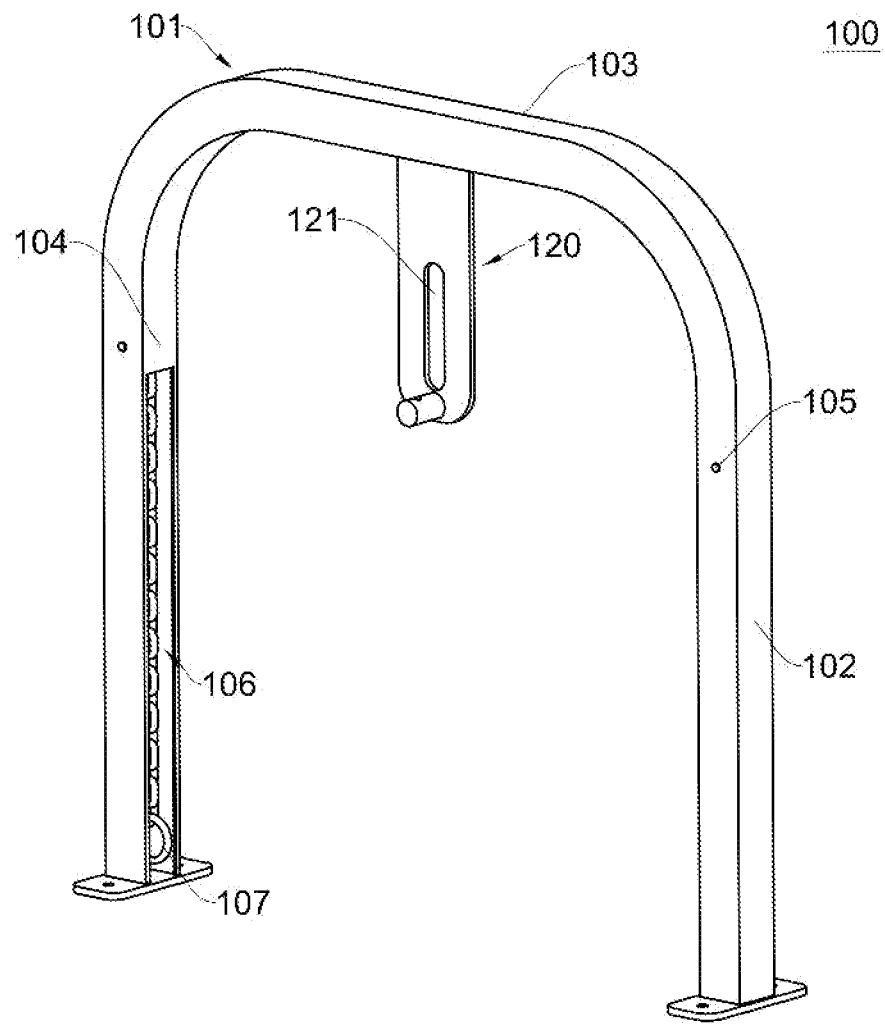
FIG. 6 is a perspective view of the U-profile variant of the present invention with the lock bracket variant

Additional correlating members, such as the lock bracket 120 as illustrated in FIG. 1, or alternatively, the horizontal lean bar 130 such as shown in FIG. 8, are permanently attached to the base structure 101 and are preferably included in the invention embodiments. These members are of specific configuration and design with the essential common purpose of providing additional, and lower vertical position for engaging bicycle locks in order to secure bicycles of different sizes and frames to the invention. The lock bracket 120, is preferably fabricated as a sturdy steel plate of the specific design and configuration, is enabled to receive any standard type of bicycle locks, but with thereof purposed configuration and geometry, primarily adapted for the effective use of a conventional U-lock 140. At its upper end, the lock bracket 120 is permanently attached, preferably welded, to the bottom side of the crossbar 103. The lock bracket 120 protracts downwards in a vertical position, and is positioned at about the middle of the crossbar 103, geometrically disposed in-between the opposite uprights 102. It features one or more apertures 121, which are preferably of an elliptical shape, and capable of loosely receiving the U-lock shackle 141. Additionally, the padlock peg 110 may be permanently attached under an aperture 121. In one embodiment, as shown in FIG. 6, the lock bracket 120 features one longer elliptical aperture 121, whereas in the other embodiment, such as illustrated in FIG. 1, has two smaller apertures 121. The apertures 121 enable receiving and adjustable vertical mounting of the U-lock 140, such as illustrated in FIG. 4, wherein the U-lock shackle 141 can easily engage to the lock holder 120, and secure the parts of the parked bicycle 160, preferably the frame. When the U-lock 140 is engaged to the lock bracket 120, its shackle 141 may easily reach to, and engage even around the frame down tube, an essential part of bicycles. Simultaneously, due to the configuration, the bottom-end links 107 can be easily hooked onto the shackle 141, wherein the ancillary chains 106 are looped around the wheels or other parts of the bicycle 160. Additionally, the preferably elliptic shape of the aperture 121, has two more advantages. It enables sufficient vertical movement and adjustment of the U-lock 140 when engaged to the lock bracket 120, and, from a production standpoint, efficient use of the material in the construction of a relatively long but compact and sturdy lock bracket 120. In embodiments with two apertures such as shown in FIG. 1, the lock bracket 120 is characterized by further enhancements. First, it enables optional engaging of the U-lock 140 at different favorable vertical positions depending on the size and frame type of parked bicycles, such that bicycles are being tightly secured, which lowers the options for vandalism, for example, damage by forcible shaking. Second, and more important. Alternative mounting the U-lock 140 at a higher vertical position on the lock bracket 120 in securing the bicycle 160 to the invention improve its anti-theft resistance. For example, in the case of the parked bicycle theft attempt, the engaged U-lock shackle 141 cut-resistance to an attack by long heavy-duty bolt cutters, bike thieves tool-of-choice, increases if the U-lock 140 is mounted in a higher vertical position on the invention. More specifically, the bolt cutter angle of attack on the U-lock shackle 141 increases, and a thief loses a favorable position to achieve and use the maximum cutting force of the bolt cutters to the U-lock shackle 141, since applying his full strength and weight on one handle, while using the ground fulcrum on the other handle of the bolt cutter is prevented.

Figure 9:
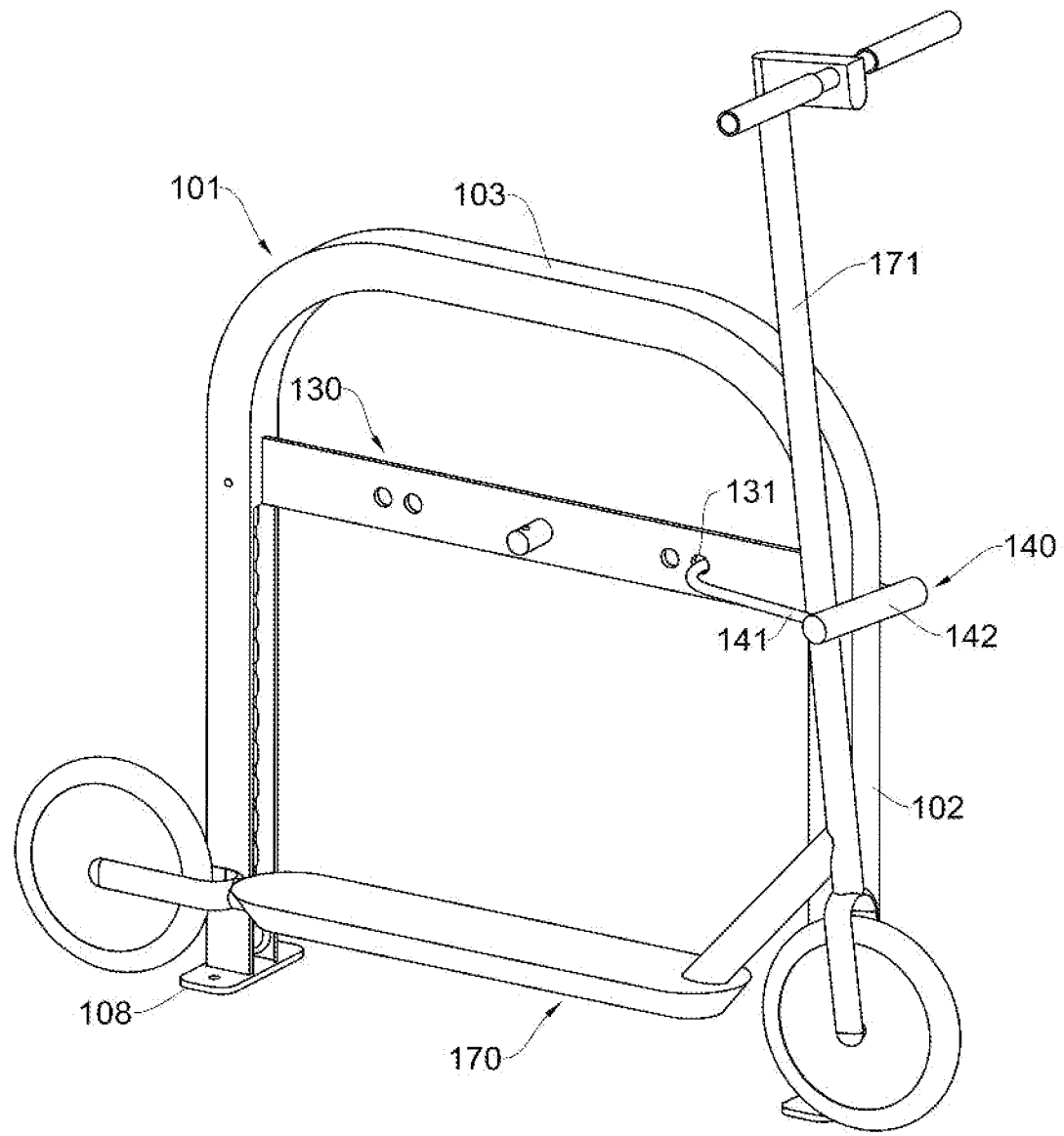
FIG. 9 is a perspective view of the U-profile variant of the present invention with the horizontal lean bar, illustrating the contemplated use of present invention for the parking of scooters with the U-lock

Alternatively, such as illustrated in FIG. 8, the invention embodiment comprises the horizontal lean bar 130, a member that is in a conventional form known in the art, however of different design and configuration. Two main modifications, set horizontal lean bar 130 embodiments apart from the previous art. Same as with the lock bracket 120, the padlock pegs 110, one on each side of the horizontal lean bar 130, may be permanently attached thereto. Second, and as equally important, apertures 131, which are preferably of a circular shape, are purposely configured on the horizontal bar 130 in lateral position in regards to both uprights 102, which introduces yet another advantageous feature of the invention—securing kick or electric scooters, preferably with the use of a conventional user-provided U-lock 140 such as shown in FIG. 9. Being purposed as the anchorage points for mounting the U-lock 140 in securing a parked scooter 170 to the invention, the apertures 131 utilize the geometry and rigid structure of the U-locks that are, as same as the padlocks, produced in a range of almost standard sizes with small deviations even with similar products from different manufacturers in the trade. When mounted into the aperture 131, the U-lock shackle 141 is enabled to encompass the upright 102 closer to it from both sides, the front, and the back, and simultaneously engage around a steering stem 171 of the scooter 170. The steering stem 171 is positioned in between the upright 120 and the aperture 131 as depicted in FIG. 9. Due to the configuration of the apertures 131, the steering stem 171 is being locked within the rigidly enclosed narrow space and locked between the U-lock shackle 141, U-lock crossbar 142, and the base structure 101 of the embodiment. The apertures 131 are configured in a manner that the U-lock 140 does not leave enough lateral, nor horizontal clearance, for pulling the scooter 170 between the U-lock crossbar 141 and the upright 102. Thereby, the parked scooter 170 is secured well against theft, and chances for vandalism are minimized.

What is claimed:

1. An enhanced security bicycle and scooter parking rack, comprising: a base structure comprised of an elongated beam, shaped to be comprised of two vertical uprights and a crossbar, said crossbar extends between and connects top end of the two vertical uprights, wherein the base structure is affixed to a solid surface or ground via base plates, and extends in a vertical direction, a horizontal cross-sectional profile of the uprights is substantially U-shaped; wherein an open side of the U-shaped cross-sectional profile of the uprights is oriented inwards such that the open side of a first upright of the two vertical uprights is facing the open side of a second opposite upright of the two vertical uprights; a semi-enclosed housing permanently attached to a top part of each vertical upright, wherein the semi-enclosed housing is opened at least from a bottom side thereof; and a first and a second ancillary chains, wherein each ancillary chain is comprised of plurality of connected links, such that each ancillary chain is capable of being wrapped around parts of a parked bicycle, the first ancillary chain being permanently attached at atop end with a fastening means inside the semi-enclosed housing of the first vertical upright, such that the rest of the first ancillary chain is suspended as a pendulum through the bottom side of the semi-enclosed housing, and extending vertically downwards within the U-shaped profile of the first vertical upright, wherein a bottom-end link of the first ancillary chain is in close proximity but not in contact with the base plates nor the ground when the first ancillary chain is in idle initial position and not being used for securing bicycles; the second ancillary chain being suspended in an identical configuration as the first ancillary chain within the second opposite upright; the bottom-end link of the first ancillary chain and a bottom-end link of the second ancillary chain are generally of a ring or oval shape, in order to hook onto a conventional U-lock shackle or other member adapted for fitting inside an inner diameter of the respective bottom-end link.

2. The enhanced security bicycle and scooter parking rack according to claim 1, further comprising a lock bracket, shaped as an elongated, wide and sturdy flat bar with at least one aperture thereto, such that the lock bracket is capable of receiving a variety of conventional bicycle locks and configured to provide vertical adjustment of the bicycle locks using the at least one aperture to easily reach and engage with parts of the parked bicycle and the bottom-end links of the ancillary chains, the lock bracket being permanently and rigidly attached at a top side to a bottom side of the crossbar and disposed at the middle of the crossbar and extending vertically downwards therefrom.

3. The enhanced security bicycle and scooter parking rack according to claim 2, further comprising a cylindrical padlock peg with a padlock eyelet used as an anchorage point for a variety of conventional padlocks, the padlock peg is permanently attached to a lower part of the lock bracket below the at least one aperture, the padlock peg is configured to receive the bottom-end links within a clearance between the padlock eyelet and the lock bracket; the bottom-end links are locked in place by a padlock inserted inside the padlock eyelet.

4. The enhanced security bicycle and scooter parking rack according to claim 1, further comprising a horizontal flat bar permanently attached to and extending between the two vertical uprights, the horizontal flat bar is capable of being engaged by a variety of bicycle locks at variety of horizontal positions on the flat bar, in order to easily reach and engage with parts of the parked bicycle and the bottom-end links of the ancillary chains.

5. The enhanced security bicycle and scooter parking rack according to claim 4, further comprising a cylindrical padlock peg with a padlock eyelet used as an anchorage point for a variety of conventional padlocks, the padlock peg is permanently attached to approximately the middle of the horizontal flat bar, the padlock peg is configured to receive the bottom-end links within a clearance between the padlock eyelet and the horizontal flat bar, the bottom-end links are locked in place by a padlock inserted inside the padlock eyelet.

6. The enhanced security bicycle and scooter parking rack according to claim 4, wherein the horizontal flat bar further comprises a plurality of apertures that are disposed horizontally along a length of the horizontal flat bar, and configured to receive a U-lock shackle, such that the U-lock shackle is configured to engage and lock together one of the uprights and an aperture from the plurality of apertures closer to the one of the uprights and a steering stem of a kick or electric scooter that is parked at the rack.

7. An enhanced security bicycle and scooter parking rack, comprising: a base structure comprised of an elongated beam, shaped to be comprised of two vertical uprights and a crossbar, said crossbar extends between and connects top end of the two vertical uprights, wherein the base structure is affixed to a solid surface or ground via base plates, and extends in a vertical direction, a horizontal cross-sectional profile of the uprights is substantially C-shaped; wherein an open side of the C-shaped cross-sectional profile of the uprights is oriented inwards such that the open side of a first upright of the two vertical uprights is facing the open side of a second opposite upright of the two vertical uprights; a semi-enclosed housing permanently attached to a top part of each vertical upright, wherein the semi-enclosed housing is opened at least from a bottom side thereof; and a first and a second ancillary chains, wherein each ancillary chain is comprised of plurality of connected links, such that each ancillary chain is capable of being wrapped around parts of a parked bicycle, the first ancillary chain being permanently attached at a top end with a fastening means inside the semi-enclosed housing of the first vertical upright, such that the rest of the first ancillary chain is suspended as a pendulum through the bottom side of the semi-enclosed housing, and extending vertically downwards within the C-shaped profile of the first vertical upright, wherein a bottom-end link of the first ancillary chain is in close proximity but not in contact with the base plates nor the ground when the first ancillary chain is in idle initial position and not being used for securing bicycles; the second ancillary chain being suspended in an identical configuration as the first ancillary chain within the second opposite upright; the bottom-end link of the first ancillary chain and a bottom-end link of the second ancillary chain are generally of a ring or oval shape, in order to hook onto a conventional U-lock shackle or other member adapted for fitting inside an inner diameter of the respective bottom-end link.

8. The enhanced security bicycle and scooter parking rack according to claim 7, further comprising a lock bracket shaped as elongated, wide and sturdy flat bar with at least one aperture thereto, such that the lock bracket is capable of receiving a variety of conventional bicycle locks and configured to provide vertical adjustment of the bicycle locks using the at least aperture to easily reach and engage with parts of the parked bicycle and the bottom-end links of the ancillary chains, the lock bracket being permanently and rigidly attached at a top side to a bottom side of the crossbar and disposed at the middle of the crossbar and extending vertically downwards therefrom.

9. The enhanced security bicycle and scooter parking rack according to claim 8, further comprising a cylindrical padlock peg with a padlock eyelet used as an anchorage point for a variety of conventional padlocks, the padlock peg is permanently attached to a lower part of the lock bracket below the at least one aperture, the padlock peg is configured to receive the bottom-end links within a clearance between the padlock eyelet and the lock bracket; the bottom-end links are locked in place by a padlock inserted inside the padlock eyelet.

10. The enhanced security bicycle and scooter parking rack according to claim 7, further comprising a horizontal flat bar permanently attached to and extending between the two vertical uprights, the horizontal flat bar is capable of being engaged by a variety of bicycle locks at variety of horizontal positions on the flat bar, in order to easily reach and engage with parts of the parked bicycle and the bottom-end links of the ancillary chains.

11. The enhanced security bicycle and scooter parking rack according to claim 10, further comprising a cylindrical padlock peg with a padlock eyelet used as an anchorage point for a variety of conventional padlocks, the padlock peg is permanently attached to approximately the middle of the horizontal flat bar, the padlock peg is configured to receive the bottom-end links within a clearance between the padlock eyelet and the horizontal flat bar, the bottom-end links are locked in place by a padlock inserted inside the padlock eyelet.

12. The enhanced security bicycle and scooter parking rack according to claim 10, wherein the horizontal flat bar further comprises a plurality of apertures that are disposed horizontally along a length of the horizontal flat bar and configured to receive a U-lock shackle, such that the U-lock shackle is configured to engage and lock together one of the uprights and an aperture from the plurality of apertures closer to the one of the uprights and a steering stem of a kick or electric scooter that is parked at the rack.

13. An enhanced security bicycle and scooter parking rack, comprising: a base structure comprised of an elongated beam shaped to be comprised of two vertical uprights and a crossbar; said crossbar extends between and connects top end of the two vertical uprights, wherein the base structure is affixed to a solid surface or ground via base plates, and extends in a vertical direction, a horizontal cross-sectional profile of the uprights is substantially T-shaped; wherein the T-shaped cross-sectional profiles of the two uprights are orientated inwards towards each other; a semi-enclosed housing permanently attached at a top part of each vertical upright, wherein the semi-enclosed housing is opened at least from a bottom side thereof; and a first ancillary chain, a second ancillary chain, a third ancillary chain, and a fourth ancillary chain, each ancillary chain comprising a bottom-end link, wherein each ancillary chain is comprised of plurality of connected links, such that each ancillary chain is capable of being wrapped around parts of a parked bicycle, the first ancillary chain being permanently attached at a top end with a fastening means inside the semi-enclosed housing of a first vertical upright of the two vertical uprights, such that the rest of the first ancillary chain is suspended as a pendulum through the bottom side of the semi-enclosed housing, and extending vertically downwards and along a first side of the T-shaped profile of the first vertical upright, wherein the bottom-end link of the first ancillary chain is in close proximity but not in contact with the base plates nor the ground when the first ancillary chain is in idle initial position and not being used for securing bicycles; the second ancillary chain being suspended in an identical configuration as the first ancillary chain on an opposite side of the T-shaped profile of the first vertical upright, the third ancillary chain being suspended in an identical configuration as the first ancillary chain along a first side of the T-shaped profile of a second upright of the two vertical uprights, the fourth ancillary chain being suspended in an identical configuration as the second ancillary chain on an opposite side of the T-shaped profile of the second vertical upright; the bottom-end link of each ancillary chain is generally of a ring or oval shape, in order to hook onto a conventional U-lock shackle or other member adapted for fitting inside an inner diameter of the respective bottom-end link.

14. The enhanced security bicycle and scooter parking rack according to claim 13, further comprising a lock bracket, shaped as an elongated, wide and sturdy flat bar with at least one aperture thereto, such that the lock bracket is capable of receiving a variety of conventional bicycle locks and configured to provide vertical adjustment of the bicycle locks using the at least one aperture to easily reach and engage with parts of the parked bicycle and the bottom-end links of the ancillary chains, the lock bracket being permanently and rigidly attached at a top side to a bottom side of the crossbar and disposed at the middle of the crossbar and extending vertically downwards therefrom.

15. The enhanced security bicycle and scooter parking rack according to claim 14, further comprising a cylindrical padlock peg with a padlock eyelet used as an anchorage point for a variety of conventional padlocks, the padlock peg is permanently attached to a lower part of the lock bracket below the at least one aperture, the padlock peg is configured to receive the bottom-end links with a clearance between the padlock eyelet and the lock bracket; the bottom-end links are locked in place by a padlock inserted inside the padlock eyelet.

16. The enhanced security bicycle and scooter parking rack according to claim 13, further comprising a horizontal flat bar permanently attached to and extending between the two vertical uprights, the horizontal flat bar is capable of being engaged by a variety of bicycle locks at a variety of horizontal positions on the flat bar, in order to easily reach and engage with the parts of the parked bicycle, and the bottom-end links of the ancillary chains.

17. The enhanced security bicycle and scooter parking rack according to claim 16, further comprising a cylindrical padlock peg with a padlock eyelet used as an anchorage point for a variety of conventional padlocks, the padlock peg is permanently attached to approximately the middle of the horizontal flat bar, the padlock peg is configured to receive the bottom-end links within a clearance between the padlock eyelet and the horizontal flat bar, the bottom-end links are locked in place by a padlock inserted inside the padlock eyelet.

18. The enhanced security bicycle and scooter parking rack according to claim 16, wherein the horizontal flat bar further comprises a plurality of apertures that are disposed horizontally along a length of the horizontal flat bar, and configured to receive a U-lock shackle, such that the U-lock shackle is configured to engage and lock together one of the uprights and an aperture from the plurality of apertures closer to the one of the uprights and a steering stem of a kick or electric scooter that is parked at the rack.

* * * * *